United States Patent [19]

Blanco et al.

[11] 4,093,526
[45] June 6, 1978

[54] HYDROMETALLURGICAL LEACHING AND REFINING OF NICKEL-COPPER CONCENTRATES, AND ELECTROWINNING OF COPPER

[75] Inventors: Jorge L. Blanco, New Orleans; Ranko P. Crnojevich, Gretna, both of La.; Courtney S. Simons, Weston, Conn.

[73] Assignee: Amax Inc., Greenwich, Conn.

[21] Appl. No.: 831,364

[22] Filed: Sep. 8, 1977

[51] Int. Cl.$^2$ ............................ C25B 1/22; C25C 1/12
[52] U.S. Cl. ........................................ 204/104; 204/108; 75/117; 75/119; 75/109
[58] Field of Search ................. 204/104, 108; 75/117, 75/119, 109

[56] References Cited

U.S. PATENT DOCUMENTS

| 3,293,027 | 12/1966 | Mackiw et al. | 75/119 |
| 3,652,265 | 3/1972 | Marschik et al. | 75/117 |
| 3,741,752 | 6/1973 | Evans et al. | 75/117 |
| 3,962,051 | 6/1976 | Symens et al. | 75/117 |

Primary Examiner—R. L. Andrews
Attorney, Agent, or Firm—Michael A. Ciomek; Eugene J. Kalil

[57] ABSTRACT

A multi-stage leaching process is provided for leaching and refining nickel-copper-sulfur concentrates, a substantial portion of the total nickel present being in an acid-soluble metallic form. The process employs a first stage atmospheric leach in combination with two serially coupled second and third stage high pressure oxidation leaching steps in which process streams are recycled within the overall process, such that a purified nickel solution is continually drawn from atmospheric leach and a purified copper product recovered from a pregnant solution obtained in the third stage leach, a spent copper-sulfuric acid being formed which is recycled back into the process for the recovery of metal values therefrom.

32 Claims, 2 Drawing Figures

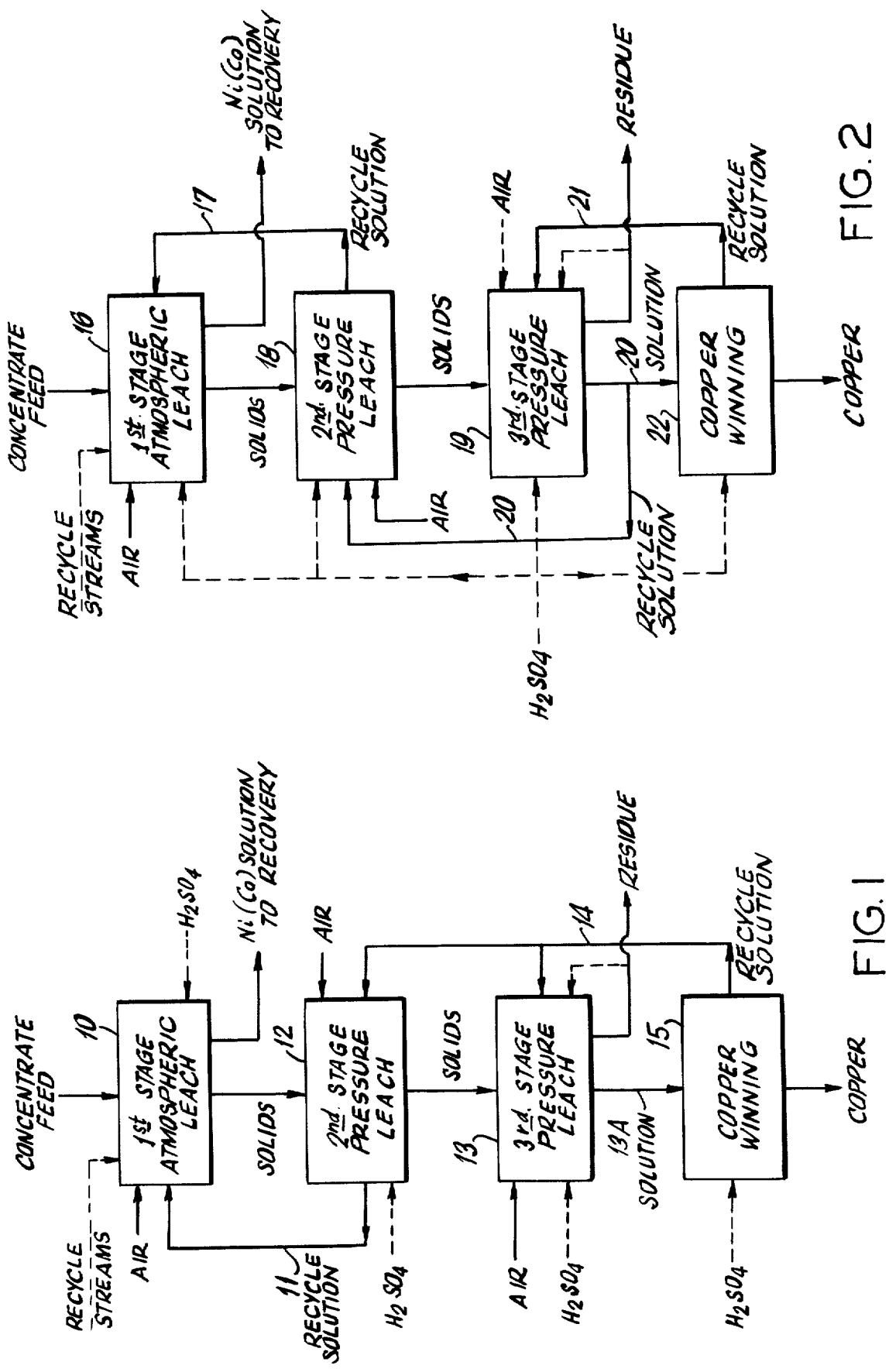

100 # HYDROMETALLURGICAL LEACHING AND REFINING OF NICKEL-COPPER CONCENTRATES, AND ELECTROWINNING OF COPPER

This invention relates to the hydrometallurgical refining of nickel-bearing materials, such as nickel-copper-sulfur concentrates and, in particular, to the hydrometallugrical refining and separation of nickel and copper from nickel-copper matte.

STATE OF THE ART

It is known to leach comminuted nickel-copper matte with the object of selectively extracting relatively pure nickel and copper therefrom. Many processes are described in the patent literature.

For example, in U.S. Pat. No. 967,072 (Aug. 9, 1910), a process is proposed for leaching high grade matte containing little or no iron in which nickel is selectively leached from the matte with hot dilute sulfuric acid while agitating the materials to hasten the reaction. The nickel sulfate solution formed is separated, dried and heated to red heat to convert it to nickel oxide which may then be reduced to metallic nickel in the usual manner.

In U.S. Pat. No. 1,756,092 (Apr. 29, 1930), a process is disclosed for selectively extracting nickel from nickel-copper matte. In order to increase the solution rate of nickel into the acid, the matte is melted and then rapidly cooled by granulation in water. The leaching is carried out in sulfuric acid under atmospheric pressure and a temperature of about 80° to 100° C.

In several more recent patents, multi-stage leaching processes are proposed for the hydrometallurgical treatment of copper-containing nickel mattes for the separate recovery therefrom of nickel and copper. As illustrative of such patents, particular reference is made to U.S. Pat. Nos. 3,293,027 (Dec. 20, 1966), 3,652,265 (Mar. 23, 1972), 3,741,752 (June 26, 1973) and 3,962,051 (June 8, 1976).

U.S. Pat. No. 3,293,027 is directed to a two-stage high pressure oxidation process for leaching nickel and associated non-ferrous metal values from high grade nickel matte. The matte is leached under oxidizing conditions as a slurry in an aqueous sulfuric acid solution, the total sulfur content of the slurry being at least the stoichiometric amount required to combine with the non-ferrous metals present (i.e. Ni, Co and Cu) as sulfates. The slurry is heated in a first stage leach at a temperature above 120° C (250° F) under a partial pressure of oxygen above 10 psig (e.g., about 0.7 atmosphere gage) and the first stage leach allowed to proceed to a terminal pH of about 3.5 to 5.5 to effect the selective leaching of nickel and thus separate it from the copper in the matte. The residue is then subjected to a second stage leach at a temperature about 120° C (250° F) under an oxygen partial pressure of over 10 psig (over 0.7 atmospheric gage) and the leaching continued at a low pH to extract substantially all of the nickel, copper and associated non-ferrous metals from the residue. The leach solutions are treated to remove the copper therefrom by precipitation as copper sulfide using $H_2S$ as the reagent and the purified solutions then treated for the recovery of nickel and any cobalt present.

An essential feature of the process is in the control of the first stage leach to a terminal pH of 3.5 to 5.5 and preferably 4.5 to 5.0. This is essential in order to insure that the copper remains in the residue; otherwise, if the oxidation proceeds too far so as to oxidize the iron in the matte, the dissolved iron tends to hydrolyze to form a precipitate of basic ferric sulfate which is accompanied by an increase in free acid concentration and the consequent reduction of pH to below 3.5 at which copper is more soluble. Since the reaction is time dependent, the desired pH of the first stage leach is achieved by controlling the time so that it does not exceed the time which favors the oxidation and hydrolysis of the iron in the slurry.

The process of the foregoing patent is particularly adapted to high grade nickel matte containing small amounts of copper. The disadvantage of this process, however, is the critical and sensitive control of process conditions necessary to assure proper pH and very low copper concentration in the solution of the first leaching step.

U.S. Pat. No. 3,652,265 relates to a process for recovering non-ferrous metal values from nickel-copper matte involving the selective separation of nickel from the matte by oxidative pressure leach followed by an equilibration of the pressure leached material to a pH of about 5.35±0.3 to precipitate copper and separate it from the dissolved nickel. The residue which contains copper is then subjected to a mild leach to dissolve the copper at a pH of about 3.5±0.7. The disadvantages of this method are: (a) the low recoveries of the contained metal values (about 90%), additional steps being needed to increase the recoveries; (b) the impure nickel and copper products obtained; (c) the prolonged leaching times employed under elevated pressure; (d) the problems inherent in the use of elemental sulfur for generating acid; and (e) the requirement of neutralization in the equilibrating step. Moreover, it is essential that the molar ratio of sulfur to nickel be in excess of 1:1.

The leaching process of U.S. Pat. No. 3,741,752 is very similar to the process of U.S. Pat. No. 3,293,027 in that a two-stage high pressure oxidation leach process is proposed for leaching nickel-copper matte.

According to U.S. Pat. No. 3,741,752, a major portion of the nickel values is extracted from the matte in a first stage high pressure oxidation leach, the solution containing a substantial amount of dissolved nickel and little or no dissolved copper. The matte treated contains substantial amounts of copper, the nickel-to-copper ratio by weight not exceeding about 2.5:1. The matte contains less sulfur than that required to combine stoichiometrically with all of the non-ferrous metal values present, a condition which is very common in such mattes.

The total sulfur in the first stage slurry, including the matte and the sulfuric acid, is controlled such that the molar ratio of the total sulfur content to the total moles of nickel, cobalt and copper in the slurry is about 1:1. This is apparently necessary in order to assure selective leaching of substantial amounts of nickel, the pH being controlled over the range of 2.5 to 5 and, preferably, from about 3.5 to 4.5.

Following the first-stage high-pressure oxidation leach, the residue remaining is subjected to a second-stage high pressure oxidation leach in an aqueous sulfuric acid solution to effect dissolution of substantially all of the nickel and copper present and provide a leach solution containing a major amount of copper and a minor amount of nickel from which the copper is then recovered electrolytically, the spent copper electrolyte produced being then recycled as make-up acid solution to at least the first-stage pressure leach.

In order to optimize the selectivity of nickel extraction in the first-stage pressure leach, the amount of spent electrolyte recycled is regulated to control the final pH in the range of 2.5 to 5.0, preferably between 3.5 to 4.5. The amount of spent electrolyte recycled must also be sufficient to prevent build-up of nickel concentration in the solution supplied to the copper recovery operation and to ensure that sufficient sulfur is available in the first-stage pressure leach slurry to satisfy both the requirements of the extracted nickel values as $NiSO_4$ and the requirements of copper content of the matte as CuS.

In the foregoing process, a major amount of the nickel is dissolved in the first stage, e.g. 70% and above. In order to assure a highly selective nickel leach in this stage, a nonoxidizing treatment is essential at a terminal pH of about 4 for a predetermined time period so that any copper in solution is replaced by nickel as a result of reaction between the dissolved copper and the unleached nickel values.

A disadvantage of the foregoing process is its lack of process flexibility and the requirement of strict controls. For example, to assure selective dissolution of substantial amounts of nickel, the sulfur content in the slurry must be strictly controlled to a mole ratio of sulfur to nickel plus cobalt plus copper of about 1:1. In addition, the ratio of nickel to copper in the matte should not exceed 2.5:1 so that the nickel of the second stage leach solution will not exceed the limits which will permit effective separation of copper and nickel in the copper electrowinning circuit.

A further disadvantage is that, where substantial amounts of copper are dissolved in the first-stage leach step due to variations in pH, the copper must be removed by precipitating it as a sulfide with a soluble sulfide reagent which adds to the reagent cost of the process. Moreover, the requirement of a nonoxidizing treatment adds to the complexity of the process and also to the cost, especially when the process is carried out commercially on a continuous basis.

In U.S. Pat. No. 3,962,051, a two-stage leaching process is disclosed in which the first stage is an atmospheric leach and the second stage a high pressure oxidation leach of the residue produced during atmospheric leach. The process is particularly adapted to the processing of relatively high iron mattes, that is, nickel-copper mattes containing up to 20% iron. A disadvantage of high iron mattes is that such mattes are not too selective to atmospheric leaching for the recovery of nickel unless the mattes are granulated and quenched from the molten state in order to render the granulated matte following comminution more active and more selective to nickel extraction. Apart from the disclosure in the aforementioned patent, mattes received from various parts of the world have different product histories and behave differently under the same leaching conditions, Thus, it may be necessary to blend, remelt and granulate such mattes from the molten state in order to assure a more uniform feed for leaching. This adds to the cost of the process.

In the foregoing patent, a two-stage atmospheric leaching step is proposed to take into account the high iron present and to speed up the atmospheric leaching therein. In the first atmospheric stage, the leaching is carried out to a pH range of about 3.5 to 4.5 using air as the oxidizing medium, the air being then replaced with oxygen in a second atmospheric stage to continue the leaching to a pH of over 5 to complete the leaching and reject iron and copper from the solution. The injection of oxygen rapidly reduces the atmospheric leaching time.

While the foregoing process is very useful in the leaching of high iron mattes, a disadvantage of the process is the tendency of nickel to build up in the solution going to the copper electrowinning circuit such as to affect adversely the purity of the copper deposit and its physical quality. In addition, there is a tendency for nickel to crystallize out at higher concentrations during the copper electrowinning process which compounds the problem and adds to the cost of maintaining a proper water/material balance throughout the leaching scheme when carried out commercially on a continuous basis. Furthermore, as stated above, there is the additional cost of melting and granulating the matte.

As will be apparent, while the multi-stage leaching processes described in the foregoing patents enable the separation and recovery of nickel and copper from nickel-copper mattes, they do not provide the kind of process flexibility desirable for commercial practice. For example, in U.S. Pat. No. 3,293,037, the method is directed to a high grade matte containing small amounts of copper in which the removal of copper in the final solution is effected by sulfide precipitation. In U.S. Pat. No. 3,652,265, long leaching and equilibrating times are required without any certainty of providing high leaching and metal recovery efficiencies. In U.S. Pat. No. 3,741,752, the nickel-to-copper weight ratio in the feed is controlled not to exceed 2.5 to 1. In U.S. Pat. No. 3,962,051, for preferred results, it is desirable to provide the matte in a granulated quenched condition and carry out the atmospheric leaching in two stages in order to assure uniform results in said atmospheric leaching step. This adds to the cost of the process.

It would thus be desirable to provide a process which is flexible, economical, which is not dependent on feed characteristics, which can handle a broad range of feed compositions and which can accept variations in process streams and still produce high purity nickel and copper products at high production efficiencies. Applicants have found that this can be achieved by employing a multi-stage leaching process in which a first stage atmospheric leaching step is combined with two serially coupled high pressure oxidation leaching steps.

OBJECTS OF THE INVENTION

It is thus an object of the invention to provide a multi-stage refining process for the hydrometallurgical treatment of sulfur-containing nickel-copper concentrates wherein an atmospheric leach is combined as a first leaching step with two serially coupled high pressure oxidation leaching steps for the recovery of non-ferrous metal values, the process being particularly characterized by operational flexibility in that it provides for variations in process conditions, including variations in the compositions of plant streams.

Another object is to provide a hydrometallurgical multi-stage refining process for the recovery of nickel, cobalt and copper values from nickel-copper sulfide mattes.

These and other objects will more clearly appear when taken in conjunction with the following disclosure and the accompanying drawing, wherein:

FIG. 1 depicts one embodiment of a flow sheet for carrying out the invention; and FIG. 2 is another embodiment of a flow sheet for carrying out the invention.

SUMMARY OF THE INVENTION

Generally speaking, the invention is directed to the multi-stage refining of nickel-bearing materials, such as sulfur-containing nickel-copper concentrates characterized by a relatively broad range of composition with respect to the non-ferrous metal values nickel, copper, optionally cobalt, and sulfur. Thus, unlike prior hydrometallurgical multi-stage leaching processes, the feed may include a wide variety of sulfur-containing, nickel-bearing materials containing nickel or its alloys in metallic form, semi-metallic nickel-copper matte, and such plant by-products as off grade metallic products, oxides, hydroxides, basic sulfates and sulfates of the non-ferrous metal values of interest, provided that the feed material contains sufficient nickel in an acid-soluble metallic form to cement out substantially all of the dissolved copper in recycle process solutions, for example, an amount of metallic nickel corresponding to at least about 20% of the total nickel present.

An advantage of the invention is that mattes of different thermal histories can be treated, including mattes which have been drastically quenched and mattes which have been moderately or slowly cooled.

The use of such a diversity of feed materials is made possible by employing an atmospheric leaching step in combination with two serially coupled high pressure oxidation leach steps, the atmospheric leach being employed as a first step in the overall process to effect substantial dissolution of nickel and to effect scavenging and purification of recycle process streams of contained copper and impurities.

In other words, the main function of the atmospheric leach is: (a) to separate nickel streams from streams containing copper, iron and other impurities; and (b) to achieve substantial nickel extraction in combination with the second stage high pressure leach.

As stated above, a preferred requirement of the invention is that at least about 20% by weight and, more preferably, at least about 30%, of the total nickel in the feed be in an acid-soluble metallic form in order to assure removal of copper as cement copper from recycle plant streams fed to the first stage atmospheric leach. For example, in mattes containing nickel as $Ni_3S_2$, which is deemed to be equivalent to $2NiS.Ni$, the amount of metallic nickel is about 33% of the total nickel present in the compound. Of course, additional metallic nickel may be present by continuing the converting operation to lower the sulfur content below 26% or by blending off grade particulate nickel with the feed material.

Generally speaking, the upper limit of metallic nickel in the sulfur-containing feed may range upwards of about 50% to 70% of the total nickel present. Thus, the amount of metallic nickel may range from about 20% to 70% of the total nickel present.

Hereinafter, any reference to nickel in any form shall be undersood to apply to cobalt. Thus, a reference to the recovery of nickel is understood to apply to cobalt.

An advantage of the invention is that a great variety of nickel-copper concentrates can be treated (e.g., having a nickel-to-copper weight ratio ranging up to as high as about 10:1 and higher).

Thus, unlike the prior art, the invention enables the treatment of such variable feed material under very flexible process conditions, while, at the same time, assures very high recoveries of the metal values, for example, essentially complete recovery of over 90% and as high as 99% when the process is carried out on a continuous basis.

In carrying the invention into practice, the concentrate is formed into a slurry generally having a pulp density ranging from about 5 to 25% solids by weight in a copper-containing sulfuric acid solution having an initial pH ranging up to about 3.5 and the slurry subjected to a first stage atmospheric leaching and refining step at atmospheric pressure and a temperature ranging from about 40° to 95° C, preferably from about 60° to 85° C, while aerating said slurry. The time is sufficient to effect dissolution of substantial amounts of nickel, during which copper is cemented out and nickel sulfate formed, the leaching being continued to a terminal pH of over about 5 to refine and purify said solution by further rejecting copper and impurities by hydrolysis therefrom and provide a first stage residue containing undissolved nickel and copper, together with impurities.

This step is very important in that it provides metallic copper and copper hydroxide in the residue which is passed on to the second stage pressure leach for dissolution therein to provide copper sulfate which reacts with undissolved metallics and primarily with nickel sulfide (NiS) in the residue to form nickel sulfate and copper sulfide, the nickel sulfate being thereafter recovered by recycle of the second stage leach liquor to atmospheric leach.

The purified nickel-containing solution is separated from the residue for nickel recovery and the residue subjected in the form of a slurry to a second stage leaching step at elevated temperature and pressure in a sulfuric acid-containing solution at a pH below 3.5 under oxidizing conditions for a time sufficient to reach a terminal pH ranging from about 2.5 to 4 and preferably from about 2.8 to 3.3 to effect additional dissolution of nickel and some copper and provide a pregnant solution thereof and a second stage residue impoverished in said nickel. Thus, the copper sulfate formed by dissolution from the cement copper aids further in the leaching of the nickel in the residue. The net result of this leaching step may show no change in the copper concentration in the leach solution in that, as the cemented copper in the atmospheric leach residue dissolves to form copper sulfate, the copper sulfate reacts with the nickel sulfide in the residue to form nickel sulfate and copper sulfide by metathesis. It has been found that the desired results in the second stage leach are easily obtainable by controlling the total molar ratio of free $H_2SO_4$ plus $CuSO_4$ in the spent copper sulfuric acid solution to the unleached nickel in the atmospheric leach residue over the range of about 0.7 to 1.3 and, preferably, from about 0.7 to 0.95.

The second stage pregnant solution containing both nickel and copper is separated from the second residue and recycled to the first stage atmospheric leach for removal of copper and impurities therefrom and provide a refined and purified nickel solution from which a substantially pure nickel product is subsequently recovered.

As will be clearly apparent, the second stage leach performs two important functions: (a) it effects solubilization of NiS by oxidation and by metathesis with recycle $CuSO_4$ from the spent copper winning solution, thus consuming at least part of the $CuSO_4$ solution recycled to it; and (b) it effects acid dissolution of cement and hydrolyzed copper formed in the atmospheric leach residue and thereby provides for the production of additional CuSO$_4$ for metathesis reaction with NiS in the second stage leach and for recycle to the atmospheric leach circuit for solubilizing metallic nickel therein, cement copper being formed for repeating the cycle. The foregoing functions are important in achieving the aims of the invention, while enabling broad operational flexibility not readily obtainable in prior art processes.

The resulting second stage residue is subjected to a third stage leaching step under oxidizing conditions at elevated temperature and pressure in a sulfuric acid-containing solution with the molar ratio of total sulfur to total non-ferrous metals in the slurry ranging from about 0.9:1 to 1.3:1, preferably 1:1 to 1.1:1 to effect dissolution of substantially all of the nickel, cobalt and copper present and form a third stage residue and a third stage pregnant solution having a terminal pH ranging up to about 3 and, preferably, from about 1.5 to 2.5. The third stage pregnant solution is separated from the residue and subjected to the selective removal of copper by any one of several copper winning methods accompanied by the regeneration of free acid. A preferred method is the electrowinning of copper. Alternate copper winning methods may include the precipitation of copper using SO$_2$ gas or H$_2$ gas under pressure by processes well known in the art. The foregoing methods provide a spent copper-sulfuric acid solution which is recycled back into the system, for example, to one or more of the various leaching stages.

An advantage of the atmospheric leaching step is that it enables the recycle of process streams within the system and ultimately to the first stage atmospheric leach stage by means of which nickel is continuously removed from the system in the form of a relatively pure solution and copper and impurities caused to flow with the residues through the high pressure leaching stages, such that relatively pure copper is recovered from the third stage pregnant solution formed in the third stage pressure leaching stage, with substantially all of the impurities appearing in the final residue.

The atmospheric leaching step uniquely performs several functions (1) it effects dissolution of substantial amounts of nickel from the fresh feed; (2) it allows the second stage leach to be carried under flexible and easily controlled conditions; (3) it scavenges impurities and copper from the solution and hence purifies it; (4) and like (3) above, it refines recycle solutions containing substantial amounts of nickel and copper, wherein copper is cemented out by the metallic nickel in the feed and any residual copper and impurities further removed by hydrolysis by increasing the pH to over 5. The final solution is a substantially pure nickel solution from which a substantially pure nickel product can be produced.

The invention is particularly applicable to the following nickel-copper-sulfur material, which may be in the form of a concentrate, a matte or a blended composition of a variety of nickel-bearing materials. The composition is given in percent by weight as follows:

Ni about 30% to 70%
Cu about 5% to 40%
S about 5% to 25%
Fe up to about 15%
As up to about 5%

The total nickel plus copper plus sulfur is generally at least about 75% of the total weight of the composition.

Other impurities which may be present in addition to iron and arsenic include Si, Se, Al, Cr, Ca, Bi, etc., each normally below about 1%, the total impurities ranging up to about 5% by weight. As stated hereinabove, the composition contains at least about 20% and, preferably, at least about 30%, by weight of acid-soluble metallic nickel based on the total weight of nickel in the composition, the nickel-to-copper ratio by weight as stated earlier ranging up up to about 10:1 and higher. The amount of sulfur present in the composition should preferably be stoichiometrically equal or less than that required to combine with the nickel and cobalt in the material.

Examples of different feed blend compositions which may be employed in carrying out the invention are as follows:

Table 1

| Blend No. 1 | | Blend No. 2 | | Blend No. 3 | |
|---|---|---|---|---|---|
| Ni | 65% | Ni | 27% | Ni | 45% |
| Cu | 10% | Cu | 40% | Cu | 30% |
| Fe | 2% | Fe | 8% | Fe | 5% |
| S | 20% | S | 22% | S | 20% |
| Impurities | 3% | Impurities | 3% | | |
| Ni/Cu$^1$ = | 6.5 | Ni/Cu$^1$ = | 0.67 | Ni/Cu$^1$ = | 1.5 |
| Ni$^2$ = | 52 | Ni$^2$ = | 20 | Ni$^2$ = | 43 |

$^1$weight ratio
$^2$% metallic nickel of total nickel present

First Stage Atmospheric Leaching and Purification Step

As stated hereinbefore, this step has three basic, equally important functions:

(a) To perform partial solubilization of nickel, for example, 30% to 60% by weight of the total nickel. In a blended composition, substantially all of the metallic nickel, oxides, basic sulfates, sulfates and freshly precipitated sulfides will be solubilized in this step. A portion of the natural or pyrometallurgical sulfides will also be attacked.

(b) To allow for greater flexibility in the carrying out of the second stage pressure leach for advantageously producing a high concentration of copper in the pregnant leach solution.

(c) To produce pure nickel solutions with impurities below specified amounts in order to yield a final nickel product of high purity. This is accomplished by employing oxidizing conditions (air or oxygen) and controlling the terminal pH in the range of about 5 to 6 over a temperature range of about 40° to 95° C and preferably from about 60° to 85° C. At the foregoing pH range, hydrolysis of dissolved copper and impurities occurs. The time required is dependent on the amount of impurities and may range from 1 to 6 hours.

The combination of oxidizing and hydrolyzing conditions aids in normally producing a pregnant solution containing 60 to 100 grams per liter (gpl) nickel, with impurities depressed on the following levels:

| ppm | ppm |
|---|---|
| Cu < 10 | Al < 5 |
| Fe < 5 | As < 5 |
| Se < 3 | Sb < 5 |
| Si < 30 | Pb < 3 |
| Cr < 5 | |

Since the atmospheric leach performs a scavenging function in addition to solubilizing nickel, this step is a convenient place to recycle various internal process streams which are unavoidable in any nickel processing plant, such as tailing water, plant spillages, offgrade metal products, side refining streams and recycle streams from some of the leaching stages. These streams generally have a high content of various impurities which accumulate over a period of time and which must be rejected. This step is also useful for consuming soluble crude materials, such as crude nickel sulfate salt.

A large portion of the first stage atmospheric leaching solution, and sometimes substantially all of it, is made up of recycle solution from the second stage high pressure oxidation leach, the recycle solution containing nickel not leached in the first stage atmospheric leach, the solution being unusually low in impurities. This solution generally contains a relatively high concentration of copper ranging from about 10 to 50 gpl, a large portion of which is substantially cemented out during the first stage atmospheric leach.

The Second Stage Pressure Leach

The leached slurry of the first stage is subjected to liquid-solid separation. The first stage pregnant solution, which is a substantially pure nickel solution, is further treated to recover nickel. The first stage residue which contains all of the unleached nickel and substantially all of the copper, including cemented and hydrolyzed copper, together with impurities, is then subjected to a second stage high pressure oxidation leach under conditions which maintain the impurities in the residue. The make-up solution may be a recycle stream of spent copper-sulfuric acid solution from the copper winning circuit or, in the alternative, part of the third stage pregnant solution from the subsequent third stage high pressure oxidation leach (also referred to as the total leach).

The terminal pH of the recycle stream may range up to about 3.5, for example, range from about 0.3 to 2 and contain leached impurities, such as one or more of iron, selenium, arsenic, silicon, bismuth, etc., among others.

As will be apparent, the solubilization of nickel in the first stage atmospheric leach and the purification of nickel streams recycled thereto provide a counterflow process. The second stage high pressure leach is carried out under strongly oxidizing conditions at an oxygen partial pressure of at least about 0.3 atmosphere gage, preferably about 2 to 4 atmospheres gage, which produces a stream containing amounts of copper ranging up to about 10 or 50 gpl. The copper is desirable in the second stage pregnant solution for recycle to the first stage atmospheric leach in that it provides cupric ion effective for the solubilization of nickel, the copper cementing out. Any additional dissolved copper present is rejected by hydrolysis as the pH in the first stage atmospheric leach increases to over 5, for example, to between 5 and 6.

The amount of nickel leached in the second stage leach based on the total nickel in the feed material is generally less than about 50% by weight of the total nickel present. A main function of the second stage pressure leach is to depress a substantial portion of iron and other impurities so as to produce a recycle stream with a relatively low iron content, such as below 0.5 gpl (below 500 ppm).

If desired, a portion of the feed solids can be fed to the second stage leach, such as metallics, hydroxides, basic sulfate salts and sulfides of the non-ferrous metal values of interest.

The recycle stream fed to the second stage leach and the second stage pregnant solution produced in the second stage leach may have the following typical compositions.

Table 2

| Element | Before 2nd Stage Leach (gpl) | After 2nd Stage Leach (gpl) |
|---------|------------------------------|------------------------------|
| Ni      | 20 – 50                      | 40 – 100                     |
| Cu      | 25 – 70                      | 10 – 50                      |
| Fe      | 2 – 10                       | <0.5                         |
| Se      | <0.05                        | <0.01                        |
| Silica  | 0.1 – 0.2                    | 0.05 – 0.1                   |
| Cr      | 1 – 2                        | <0.1                         |
| Al      | 1 – 2                        | <0.5                         |

The preferred conditions employed are as follows:

Table 3

| | |
|---|---|
| Temperature | 140° C – 160° C |
| Oxygen Pressure | 3.5 – 7 atm. gage |
| Terminal pH | 2.8 – 3.3 |
| Oxygen Supply | Sufficient to oxidize metallics in the feed to their respective oxides, some 10 to 30% of the sulfide sulfur to sulfates, and to convert the ferrous ion to the ferric form |
| Time | 30 – 45 minutes |

The total molar ratio of free $H_2SO_4$ plus $CuSO_4$ in the solution to the unleached nickel in the residue ranges from about 0.7 to 0.95.

The broad range of conditions which may be employed in the second stage pressure leach are given as follows:

Table 4

| | |
|---|---|
| Temperature | 95° C to 205° C |
| Oxygen Pressure | 0.3 to 7 atm. gage |
| Total Pressure | 0.3 to 50 atm. gage |
| Time | 15 to 120 minutes |

The total molar ratio of free $H_2SO_4$ plus $CuSO_4$ in the solution to the unleached nickel in the residue ranges from about 0.7 to 1.3. As has been stated herein, the second stage pregnant solution becomes the recycle solution to the first stage atmospheric leach, the terminal pH ranging anywhere from about 2.5 to 4.

The Third Stage Pressure Leach

The purpose of this stage is to effect substantially total leaching of the second stage residue, the leaching solution in this stage being a recycle stream derived from the copper winning circuit. The third stage leaching will solubilize substantially all of the nickel, cobalt and copper present while producing a final third stage residue containing substantially all of the impurities in a form suitable for removal by either filtration, settling, flotation, and the like. It may be desirable to add make-up sulfuric acid to this stage to assure the desired final pH.

Of the undesirable impurities which reach the last leaching stage with both solids and solution, a substantial amount ends up in the residue. Normally, at least about 90% may remain in the undissolved residue, it being understood that solubilized impurities in the process are repeatedly being carried forward from the first and second stages to the final or third stage. The impurities following the total or third stage high pressure leach are generally in the crystalline form and are, therefore, easy to remove by filtering or settling. Optionally, the residue of the third stage can be partially recycled within the stage until 99% plus of each metal value is solubilized, based on the amount in the original feed.

The third stage leach performs two functions: (a) solubilization of the non-ferrous metal values of interest and (b) confinement of the impurities in the undissolved residue. The preferred conditions for this stage are as follows:

Table 5

| Temperature | 175° C to 215° C |
|---|---|
| Oxygen Pressure | 3.5 to 10 atm. gage |
| Oxygen Supply | To oxidize metals to their oxides and sulfides to sulfates |
| Terminal pH | 1.6 to 2.5 |
| Time | about 1 to 2 hours |

The molar ratio of the total sulfur to the total non-ferrous metals in the slurry ranges from about 1:1 to 1.1:1.

The conditions in the third stage pressure leach may range broadly as follows:

Table 6

| Temperature | 150° C to 240° C |
|---|---|
| Oxygen Pressure | 0.7 to 20 atm. gage |
| Total Pressure | 7 to 50 atm. gage |
| Time | 0.5 to 3 hours |

The molar ratio of the total sulfur to the total non-ferrous metals in the slurry ranges from about 0.9:1 to 1.3:1.

Typical analysis of the feed and products in this stage are given below:

Table 7

| | Feed | | Products | |
|---|---|---|---|---|
| Element | Solids % | Recycle Sol'n., gpl | Residue, % | Leach Sol'n., gpl |
| Ni | 10–30 | 30–60 | 3–10 | 30–60 |
| Cu | 20–60 | 25–40 | 5–15 | 50–70 |
| Fe | 2–10 | 2–10 | 10–50 | 2–10 |
| Si | 0.1–5 | 0.1–0.2 | 5–15 | 0.1–0.2 |
| Se | 0.1–0.2 | 0.01–0.02 | 0.3–0.5 | 0.01–0.02 |
| As | 0.1–0.3 | 0.5–1.0 | 0.5–1.0 | 0.1–0.3 |
| Ca | 0.5–1.0 | 0.1–0.2 | 1.5 | 0.1–0.2 |

The third stage residue, depending on its composition, may be recycled to the third stage leach or discarded. It is not uncommon for the final residue to contain precious metals, in which case, the residue is set aside for the subsequent recovery of such metals.

Since there is normally a sulfur deficiency, this can be made up by the addition of sulfuric acid in any one of the processing stages, the third stage and the copper recovery stage being the preferred locations for injecting additional acid.

The Copper Winning Stage

The third stage pregnant solution contains nickel and copper. Generally, the nickel and copper contents of the pregnant solution will range from about 30 gpl to 60 gpl nickel, 50 gpl to 70 gpl copper and have a pH ranging from about 1 to 3. Preferably, the copper is recovered by electrowinning, although metallic copper powder may be recovered by reduction from solution using $SO_2$ or under high pressure with $H_2$ using methods well known in the art. In either of the foregoing methods, sulfuric acid is regenerated to provide a recyclable spent copper-sulfuric acid solution. A typical recyclable solution will have the following composition:

Ni: 30 gpl to 60 gpl
Cu: 25 gpl to 40 gpl
pH: up to about 0.8

As illustrative of a preferred embodiment of the invention, the following example is given:

EXAMPLE 1

This example was carried out in accordance with the flow sheet of FIG. 1 in which about 35% and 48% nickel was leached respectively, in the first atmospheric and second pressure leach stages.

The nickel concentrate had the following composition:

Ni: 44.5%
Cu: 29.0%
Co: 0.8%
Fe: 1.8%
S: 20.7%

Oxygen and impurities, the balance about 3 to 4%.
The Ni/Cu weight ratio in the feed was 1.53:1.

The concentrate was comminuted to pass through 150 mesh screen with at least about 50% passing through 325 mesh screen (U.S. Standard).

Referring to FIG. 1, the atmospheric leach slurry was prepared to provide a pulp density of about 13% solids in atmospheric leach step 10 by mixing 10 kg of the concentrate with 10 liters $H_2O$ and 48.5 liters recycle solution 11 from the second stage pressure leach 12, the second stage pressure leach solution having the following approximate composition: 60 gpl Ni, 33 gpl Cu, 0.45 gpl Fe, 0.5-1 gpl $H_2SO_4$ (pH about 3), the solution containing the following impurities: Si and Ca $\gtrsim$ 0.2 gpl each; Al, As, Sb and Bi $\gtrsim$ 0.05 gpl each; Cr, Cd, Sn and Se $\gtrsim$ 0.01 gpl each.

The atmospheric leach slurry was maintained in the temperature range of about 75° to 85° C for 3.5 hours while continuously flowing air into the atmospheric leach tank at about 3.0 SCFM. The leaching was continued to a terminal pH between about 5 and 6 and terminated preferably at a pH of about 5.4 to 5.5

Numerous reactions take place to cause solubilization of nickel while copper and impurities are rejected from the recycle solution to provide a pure nickel-cobalt solution. These reactions include cementation, oxidation, acid neutralization and hydrolysis as follows:

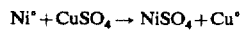
$Ni^° + CuSO_4 \rightarrow NiSO_4 + Cu^°$

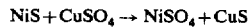
$NiS + CuSO_4 \rightarrow NiSO_4 + CuS$

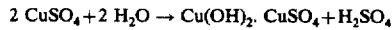
$2\ CuSO_4 + 2\ H_2O \rightarrow Cu(OH)_2 \cdot CuSO_4 + H_2SO_4$

$2\ FeSO_4 + H_2SO_4 + \tfrac{1}{2}\ O_2 \rightarrow Fe_2(SO_4)_3 + H_2O$

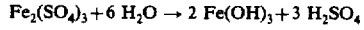
$Fe_2(SO_4)_3 + 6\ H_2O \rightarrow 2\ Fe(OH)_3 + 3\ H_2SO_4$

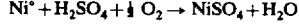
$Ni^° + H_2SO_4 + \tfrac{1}{2}\ O_2 \rightarrow NiSO_4 + H_2O$

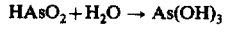
$HAsO_2 + H_2O \rightarrow As(OH)_3$

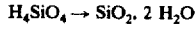
$H_4SiO_4 \rightarrow SiO_2 \cdot 2\ H_2O$

The nickel was partially solubilized until about 35% of the total nickel in the concentrate was dissolved and substantially all of the copper from the second stage pressure stage solution was cemented and/or hydrolyzed out to provide a highly enriched, purified nickel leach solution having the following approximate composition: 75 gpl Ni; 1.3 gpl Co; 0.05-0.1 gpl Ca; $\gtrsim$ 0.02 gpl Si; $\leq$ 0.01 gpl Cu and Bi each; $\leq$ 0.005 gpl each of Fe, Al, Cu, Sb, As, Sn, Se and Pb.

The leached solids or residue (10.4 kg) produced in the first stage atmospheric leach was washed with water and reslurried in 10 liters of water and 42 liters of the spent copper-sulfuric acid solution from the copper winning circuit 15 before the residue passed to the second stage pressure leach 12.

The first stage residue and the spent copper-sulfuric acid solution had the following compositions:

Table 8

| Atm. Leached Residue, % | | Spent Electrolyte, gpl | |
|---|---|---|---|
| Ni | 27.90 | Ni | 35 |
| Cu | 43.80 | Cu | 29 |
| S | 20.75 | $H_2SO_4$ | 63 |
| Fe | 2.0 | | |
| $O_2$ and Others | about 5 | | |

The amount of nickel in the feed (4.45 kg) compared to the amount of nickel in the first stage atmospheric residue (2.9 kg) calculated to a nickel extraction of about 35%.

The second stage pressure leach which provides additional nickel solubilization as well as moderate copper extraction (to supply cupric ions for the atmospheric leach) was carried out under the following conditions:

Table 9

| Temperature | 150° C – 160° C |
|---|---|
| Oxygen Pressure | 1.7 – 2.4 atm. gage |
| Acidity, pH Terminal | 3 |
| Oxygen Supply | Sufficient oxygen to oxidize metallics to oxides, ferrous ions to the ferric state and up to 10% of the sulfide sulfur to sulfates |
| Time | 30 minutes |

The primary reactions in the second stage leach are as follows:

$$Cu + H_2SO_4 + \tfrac{1}{2} O_2 \rightarrow CuSO_4 + H_2O$$

$$Cu(OH)_2 + H_2SO_4 \rightarrow CuSO_4 + 2H_2O$$

$$NiS + CuSO_4 \rightarrow CuS + NiSO_4$$

In addition, some of the sulfides are oxidized to sulfates.

The amount of the spent copper-sulfuric acid solution recycled to the second stage pressure leach was proportioned so that the molar ratio of $H_2SO_4 + CuSO_4$ in the spent solution to the unleached nickel in the atmospheric leach residue ranged from about 0.90 to 0.95.

The pregnant solution obtained in the second stage pressure leach was used as the recycle leach solution in the atmospheric leach, the composition being given below:

60 gpl Ni, 33 gpl Cu; 0.45 gpl Fe, 0.5 - 1 gpl $H_2SO_4$ (pH 3). However, the pH may range from about 2.7 to 3.5.

The second stage leach residue following second stage leaching had the following composition by weight:

| Residue weight | 8.9 kg |
|---|---|
| Ni | 17.0% |
| Cu | 46.8% |
| Fe | 2.7% |
| S | 22.1% |
| $O_2$ and impurities | about 11 to 12% |

Based on the amount of feed in the second stage pressure leach and residue remaining therein and the analysis thereof, about 48% and 9%, respectively, of nickel and copper extractions were achieved in the second stage pressure leach.

The amount of nickel extracted from the first stage residue in the second stage leach based on the total nickel in the original concentrate was about 31% by weight (cobalt extraction generally follows the nickel pattern).

The second stage residue was then passed to the third stage pressure leach 13 in which the residue was subjected to total leaching under the following conditions:

Table 10

| Temperature | 190° C to 200° C |
|---|---|
| Oxygen Pressure | 4.8 to 5.5 atm. gage |
| Oxygen Supply | To oxidize sulfide sulfur to sulfates |
| pH (Terminal) | 2 to 2.2 (The pH may range from about 1.2 to 2.4) |
| Time | 60 minutes |

Prior to third stage pressure leaching, the second stage pressure leach residue was slurried with 42 liters of fresh water and 31 liters of the spent copper-sulfuric acid (Ni - 35 gpl, Cu - 29 gpl, $H_2SO_4$ - 63 gpl). Also, 1.0 kg $H_2SO_4$ was added to make up the total sulfur/total Ni plus Cu molar ratio in this stage to about 1:1 (cobalt included). Water was added mainly to keep metal concentration in the final leach solution below a saturation level.

The foregoing provided a leach solution 13A which was passed on to the copper winning circuit 15, the solution having the following composition: Ni - 35 gpl, Cu - 68 gpl, Fe about 2.5 gpl and $H_2SO_4$ about 2 gpl.

The small amount of leach residue (about 1.0 kg) and assaying about 6% Ni and 4% Cu was washed and discarded, since the recovery of both nickel and copper based on the original concentrate was of the order of about 98% to 99%. In the event the leaching efficiency falls below the foregoing amount, the residue may be recycled to the third stage pressure leach.

As illustrative of further embodiments of the invention, the following additional examples are given:

EXAMPLE 2

This example is directed to the flow sheet of FIG. 1 and illustrates the leaching of substantial amounts of nickel from nickel-copper concentrate in the first atmospheric leach (about 48% to 50% of the total nickel) and relatively lower amounts of nickel in the second stage pressure oxidation leach in which significant amounts of copper (about 21%) are also leached.

The nickel-copper-sulfur concentrate has the following composition:

Ni: 50.1%
Cu: 24.9%
Co: 0.7%
Fe: 3.3%
S: 20.0%
Impurities: the balance (1%)

As will be noted, the Ni/Cu weight ratio in the feed is about 2:1.

The matte is comminuted to pass through 150 mesh screen with at least about 50% passing through 325 mesh screen (U.S. Standard).

An atmospheric leach slurry is produced having a pulp density of about 12 to 14% solids in atmospheric leach step 10 (FIG. 1) by mixing 10 kg of the concentrate with 10 liters $H_2O$ and 58 liters recycle solution 11 from the second stage pressure leach 12, the second stage pressure leach solution having the following approximate composition: 44 gpl Ni, 51 gpl Cu, 0.3 gpl Fe, 0.5-1 gpl $H_2SO_4$ (pH about 2.9), the solution containing the following impurities: Si and Ca $\lesssim$ 0.2 gpl each; Al, As, Sb and Bi $\lesssim$ 0.05 gpl each; Cr, Cd, Sn and Se $\lesssim$ 0.01 gpl each.

The atmospheric leach slurry is maintained in the temperature range of about 65° to 80° C for 5 hours while continuously flowing air into the atmospheric leach tank at about 2.5 SCFM. The leaching is carried out to a terminal pH between about 5 and 6 and preferably stopped at a pH of about 5.4 to 5.5.

Numerous reactions take place to cause solubilization of nickel while copper and impurities are rejected from the recycle solution to provide a substantially pure nickel solution. These reactions include cementation, oxidation, acid neutralization and hydrolysis as stated in Example 1.

Nickel is partially solubilized until about 48% to 50% of the total nickel in the concentrate is dissolved and substantially all of the copper from the second stage pressure stage solution is cemented and/or hydrolyzed out to provide a highly enriched, purified nickel leach solution having the following approximate composition: 76 gpl Ni; 0.05-0.1 gpl Ca; $\gtrsim$ 0.02 gpl Si; $\leq$ 0.01 gpl Cu and Bi each; $\leq$ 0.005 gpl each of Fe, Al, Sb, As, Sn, Se and Pb.

The leached solids or residue (12 kg) produced in the first stage atmospheric leach is washed with water and reslurried in 15 liters of water and 45 liters of the spent copper-sulfuric acid solution from the copper winning circuit 15 before the residue is passed to the second stage pressure leach 12.

The first stage residue and the spent copper-sulfuric acid solution will have the following compositions:

Table 11

| Atm. Leached Residue, % | | Spent Electrolyte, gpl | |
|---|---|---|---|
| Ni | 21.6 | Ni | 34 |
| Cu | 45.0 | Cu | 40 |
| S | 18.3 | $H_2SO_4$ | 59 |
| Fe | 2.9 | | |
| $O_2$, Others | 12 | | |

The amount of nickel in the feed (5 kg Ni) compared to the amount of nickel in the first stage atmospheric residue (2.6) corresponds to a nickel extraction of about 48%.

The second stage pressure leach provides additional copper sulfate due to dissolution of the cement copper in the residue which aids in the solubilization of nickel in the residue. The leaching conditions are as follows:

Table 12

| Temperature | 155° C to 165° C |
|---|---|
| Oxygen Pressure | 2.7 to 3.4 atm. gage |
| Acidity, pH Terminal | 2.9 |
| Oxygen Supply | Sufficient oxygen to oxidize metallics to oxides, about 10% sulfide sulfur to sulfates and ferrous ions to the ferric state |
| Time | 30 minutes |

The amount of the spent copper-sulfuric acid solution recycled to the second stage pressure leach is proportioned to provide a molar ratio of free $H_2SO_4$ plus $CuSO_4$ to the nickel in the atmospheric leach residue of about 1.26:1. As stated hereinbefore, the foregoing ratio can range from about 0.7:1 to 1.3:1 and, preferably, about 0.7:1 to 0.95:1.

The pregnant solution obtained in the second stage pressure leach is used as the recycle leach solution in the atmospheric leach, the composition being given below:

44 gpl Ni; 51 gpl Cu, 0.3 gpl Fe; 0.5-1 gpl $H_2SO_4$ (pH 2.9).

The amount of impurities in solution is about: Si and Ca $\lesssim$ 0.2 gpl each; each of Al, Mn, As, Sb and Bi $\lesssim$ 0.05 gpl; and each of Cr, Sn and Se $\leq$ 0.01 gpl. The pH may range from about 2.7 to 3.5

The second stage leach residue following second stage leaching has the following composition by weight:

| Weight | 8.6 kg |
|---|---|
| Ni | 18.4% |
| Cu | 50.0% |
| Co | 0.24% |
| Fe | 4.9% |
| S | 22.1% |
| $O_2$ and other impurities | about 4–5% |

Based on the amount of feed and residues and the analysis thereof, the nickel and copper extractions for the second stage pressure leach is as follows:

Table 13

| First Stage Atm. Leach Residue | | Second Stage Press. Leach Residue | | Extraction | |
|---|---|---|---|---|---|
| kg | 12.0 | kg | 8.6 | — | |
| Ni, % | 21.6 | Ni, % | 18.4 | Ni, % | 39.0 |
| Cu, % | 45.0 | Cu, % | 50.0 | Cu, % | 20.4 |

(Cobalt extraction generally follows the nickel pattern)

The amount of nickel extracted from the first stage residue in the second stage leach based on the total nickel in the original feed is about 20.4% by weight.

The second stage residue is passed to the third stage pressure leach 13 in which the residue is subjected to total leaching under the following conditions:

Table 14

| Temperature | 190° C to 200° C |
|---|---|
| Oxygen Pressure | 5 to 5.5 atm. gage |
| Oxygen Supply | To oxidize sulfur (sulfides) to sulfates and effect dissolution thereof |
| pH (Terminal) | 2 – 2.2 (The pH may range from about 1.2 to 2.4) |
| Time | 45 minutes |

Prior to third stage pressure leaching, the second stage pressure leach residue is slurried with 44 liters of fresh water and 21 liters of the spent copper-sulfuric acid (Ni - 34 gpl, Cu - 40 gpl, $H_2SO_4$ - 59 gpl). Also, 2.2 kg $H_2SO_4$ is added to make up total sulfur/total Ni+Cu molar ratio in this stage to about 1:1 (cobalt included). Water is added mainly to keep metal concentration in the final leach solution below a saturation level.

The foregoing provides a leach solution 13A which goes to the copper winning circuit 15, the solution having the following composition: Ni 34 gpl, Cu 77 gpl, Fe 2.5 - 3 gpl.

The small amount of leach residue (0.95 kg) is generally discarded after washing. The residue assays 5.2% Ni, 7.9% Cu, 10% S, 37.5% Fe and contains other impurities depending on their content in the feed concentrate. About 99% nickel and 98% copper total are extracted from the original feed.

The third state pregnant solution is passed to the copper winning circuit to recover the copper and provide the recycle spend copper-sulfuric acid solution 14 for recycling to third stage leach 13 and second stage leach 12 as shown in FIG. 1.

EXAMPLE 3

The following example is carried out in accordance with the flow sheet of FIG. 1 in which relatively low nickel (28 to 30%) is leached in the first stage atmospheric leach and in which relatively high nickel extraction (57%) is obtained in the second stage pressure leach stage.

The same nickel-copper concentrate as in Example 2 is subjected first to atmospheric leaching after 10 kg of the concentrate is slurried with 10 liters water and 51 liters of a recycle solution from the second stage pressure leach 12. The second stage pressure leach has the following approximate composition: 69.2 gpl Ni, 32 gpl Cu, 1.0 gpl Co, 0.2 gpl Fe, 0.5 - 1 gpl $H_2SO_4$ (pH 3.1), other impurities being at about the same level as in Example 2.

The atmospheric leach slurry is maintained in the temperature range of 70° to 80° C for 2 hours while continuously blowing air into the leach tank at about 3.0 SCFM. The leaching is carried out to reach a pH between about 5 and 6, more preferably, at a terminal pH of about 5.5.

A marginal amount of nickel is quickly solubilized corresponding to about 28% of the total nickel in the concentrate, while the copper from the second stage pressure solution is cemented and/or hydrolyzed out to provide a highly enriched and purified nickel leach solution having the following approximate composition 84 gpl Ni, and very low and similar levels of other impurities (Ca, Si, Cu, Bi, Fe, Al, Cr, Sb, As, Sn, Se) as in Example 2.

The leached residue (10.8 kg) is washed with water and reslurried with 5.3 liters $H_2O$ and 48 liters of the spent copper-sulfuric acid solution from the copper winning circuit before the slurry is passed to the second pressure leach 12.

The atmospherically leached residue and the recycle solution have the following compositions:

Table 15

| Atm. Leached Reside, % | | Recycle solution, gpl | |
|---|---|---|---|
| Ni | 33.6 | Ni | 31.2 |
| Cu | 38.9 | Cu | 35.0 |
| S | 21.0 | $H_2SO_4$ | 61.2 |
| Fe | 3.2 | | |
| $O_2$, others | 3 - 4 | | |

(Thus, nickel extraction achieved in the atmospheric leach is about 27.5 to 28.0%).

The second stage pressure leach which provides additional nickel solubilization is carried out under the following conditions:

Table 16

| Temperature | 150° C to 155° C |
|---|---|
| Oxygen Pressure | 2.8 to 3.4 atm. gage |
| Acidity, pH (Terminal) | 3.1 |
| Oxygen Supply | Sufficient to oxidize metallics to oxides, about 10% sulfur to sulfates and ferrous ions to the ferric state |
| Time | 25 minutes |

The amount of the recycle copper-sulfuric acid solution 14 is proportioned in the second stage so as to provide a molar ratio of free $H_2SO_4$ plus $CuSO_4$ to the nickel in the atmospheric leach residue of about 0.9:1.

After completion of the second stage pressure leach, the following second stage leach solution 11 was obtained for recycle to the atmospheric leach: 69.2 gpl Ni, 32 gpl Cu, 0.2 gpl Fe, 0.5 - 1.0 gpl $H_2SO_4$ (pH terminal 3.1) an impurities as in Example 1.

The pH in this stage may range from about 2.7 to 3.5. The second stage leached residue following leaching has the following composition by weight:

| Weight | 8.3 kg |
|---|---|
| Ni | 18.6% |
| Cu | 50.4% |
| Co | 0.2% |
| S | 23.2% |
| Fe | 3.9% |
| $O_2$, others | 3 - 4% |

Thus, on the basis of the initial and final weights of solids and analysis thereof, the following nickel and copper extractions are obtained in the second stage pressure leach:

Table 17

| Atm. Leach Residue | | Second Stage Press. Leach Residue | | Extractions |
|---|---|---|---|---|
| Kg | 10.8 | Kg | 8.3 | — |
| Ni,% | 33.6 | Ni,% | 18.6 | 57.5% |
| Cu,% | 38.9 | Cu,% | 50.4 | 0.5% |

The amount of nickel leached in the second stage based on the original nickel in the feed is about 42% by weight.

The second stage residue is passed to the third stage pressure leach 13 in which the residue is subjected to total leaching under the following conditions:

Table 18

| Temperature | 195° C to 205° C |
|---|---|
| Oxygen Pressure | 5.8 to 7 atm. gage |
| Oxygen Supply | To oxidize sulfide sulfur to sulfates to effect dissolution thereof |
| Acidity (pH) | 1.8 to 2.0 |
| Time | 40 minutes |

In preparing the slurry for the third stage leach, the second stage pressure leach residue is slurried with 47 liters of water and 12.8 liters of the spent copper-sulfuric acid solution 14 from the copper winning stage 15 (31.2 gpl Ni, 35.0 gpl Cu, 61.2 gpl $H_2SO_4$). Also, 2.3 kg of concentrated $H_2SO_4$ is added to make up the total sulfur/total Ni+Cu molar ratio in this stage to about 1:1.

The total or third stage leach provides a leach solution to the copper winning stage or circuit 15 with the following composition: Ni 31.2 gpl, Cu 75.3 gpl, Fe 3-4 gpl.

The leached residue after washing (0.8 kg) which contains only about 1 and 2% of nickel and copper, respectively, contained in the original feed may be discarded. Iron and other impurities are also concentrated in this final residue.

The leach solution is passed through the copper winning circuit to recover a substantial portion of the contained copper and to provide recycle spent solution 14 mentioned herinabove.

EXAMPLE 4

Using the flow sheet of FIG. 1, a nickel-copper concentrate is employed having a Ni/Cu ratio by weight of about 4.14. A relatively high extraction of nickel is obtained in the first stage atmospheric leach (about 52%), and a relatively low nickel extraction (32%) and significant copper extraction (36%) are obtained in the second stage pressure leach. In carrying out the atmospheric leach, a small amount of sulfuric acid is added to the leaching solution.

The concentrate of particle size similar to Example 1 has the following assay: 57.40% Ni, 13.9% Cu, 1.5% Co, 22.3% S, 3.6% Fe and 1.0 to 1.5% trace elements (impurities).

An atmospheric leach slurry is produced in stage 10 by mixing 10 kg of the concentrate with 10 liters of $H_2O$, 0.98 kg $H_2SO_4$ and 70.5 liters of a recycle copper-sulfuric acid solution 11 from the second stage pressure leach circuit 12. The second stage pressure leach solution is determined to have roughly the following compositions upon completion of the leaching: Ni - 38 gpl, Cu - 38 gpl, Co - 1 gpl, Fe - 0.6 gpl, $H_2SO_4$ - : 0.8 gpl (pH 2.8), with other impurities being in the ranges as indicated below: Si, Ca and Al  0.2 gpl each; As, Sb, Sn and Bi  0.05 gpl each; Cd and Se  0.01 gpl each.

The first stage atmospheric leach slurry was maintained in the temperature range of 77° to 82° C for 3 hours while continuously flowing air in the leaching tanks at 4.0 SCFM. The leach is carried out to a terminal pH of about 5.7.

During atmospheric leaching, a substantial portion of nickel of the total nickel in the concentrate ($\sim$ 52%) is solubilized while practically all of copper and other trace elements from the recycle second pressure stage solution are cemented out and/or hydrolyzed to provide a highly enriched and purified nickel leach solution having the following composition: 73 gpl Ni, 1.8 gpl Co and other impurities being at or below the level indicated in Example 1.

The leached residue (9.5 kg) which is produced in the first stage atmospheric leach is washed with water and reslurried with 38 liters $H_2O$ and 35 liters of spent copper-sulfuric acid solution 14 from the copper winning circuit 15 before the slurry is passed to the second stage pressure leach 12.

The leached residue and the recycle spent solution 14 have the following compositions:

Table 19

| Atm. Leach Residue,% | | Spent Recycle Solution, gpl | |
|---|---|---|---|
| Ni | 29.2% | Ni | 51 |
| Cu | 42.4% | Cu | 35 |
| Fe | 4.5% | $H_2SO_4$ | 45 |
| S | 23.1% | | |
| $O_2$ and others | 1 to 1.5% | | |

(The nickel extraction in the atmospheric leach is 51.7%).

The second stage pressure leach at 12 which provides additional nickel and partial copper solubilization (copper is being solubilized to supply needed cupric ions for the atmospheric leach) is carried out under the following conditions:

Table 20

| Temperature | 165° C to 170° C |
|---|---|
| Oxygen Pressure | 2.7 to 3.4 atm. gage |
| Acidity, pH (Terminal) | 2.8 |

Table 20-continued

| Oxygen Supply | Sufficient oxygen to oxidize metallics to oxides, about 30% sulfide sulfur to sulfates and ferrous ions to the ferric state |
|---|---|
| Time | 40 minutes |

The amount of the recycle spent copper winning solution 14 is proportioned to provide a total molar ratio of free $H_2SO_4$ plus $CuSO_4$ to nickel in the atmospheric leach residue of about 0.75:1.

Following the second stage pressure leach, the leach solution obtained for recycle to the atmospheric leach is given below:

Ni - 38 gpl, Cu - 38 gpl, Co - 1.0 gpl, Fe - 0.6 gpl, $H_2SO_4$ - 0.8 gpl and pH about 2.8, trace elements being indicated in the previous examples.

The pH may range from about 2.8 to 3.5. The second stage leach residue has the following composition by weight:

| Weight | 6.3 kg |
|---|---|
| Ni | 28.5% |
| Cu | 41.2% |
| Co | 0.7% |
| Fe | 5.9% |
| S | 22.2% |

On the basis of the initial and final weights and analyses of the solids, the extractions of 35% to 36% are obtained for both nickel and copper, respectively, in the second stage pressure leach. The nickel extraction based on the total nickel in the feed is about 17.5%.

The second stage leach residue is passed to the third stage pressure leach 13 in which the residue is subjected to total leaching under the following conditions:

Table 21

| Temperature | 195° C to 200° C |
|---|---|
| Oxygen Pressure | 5 to 5.5 atm. gage |
| Oxygen Supply | To oxidize sulfur (sulfides) to sulfates and effect dissolution thereof |
| Acidity, pH (Terminal) | 1.8 |
| Time | 60 minutes |

In preparing the feed for the third stage leach, the second stage pressure leach residue is slurried with $\sim$ 34 liters $H_2O$ and 8.3 liters of the spent copper-sulfuric acid solution 14 (51 gpl Ni, 35 gpl Cu, 45 gpl $H_2SO_4$, 3 - 4 gpl Fe). Also, 2.2 kg $H_2SO_4$ is added to make up the total sulfur-total Ni+Cu+Co molar ratio in the third stage at about 1:1.

The total or third stage leach provides a leach solution for the copper winning circuit having the following composition: Ni - 51 gpl, Cu - 66 gpl, Fe - 3 - 4 gpl.

The leached residue after washing (1.1 kg) contains about 1.5% and 3% of nickel and copper, respectively, of the total feed and also practically all of the trace elements.

The leach solution of the third stage pressure leach is passed to the copper winning circuit to recover copper and to provide the recycle spent solution 14 as described hereinabove.

EXAMPLE 5

In this example, the leaching is carried out in accordance with the flowsheet illustrated in FIG. 2 starting with the following feed material: Ni - 54.2%, Cu -

18.5%, Co - 0.7%, Fe - 4.3%, S - 21.2% and ~ 1% various impurities (Ni/Cu weight ratio 2.94).

The feed is comminuted to provide a size range as in Example 1. An atmospheric leach slurry 16 is produced by mixing 10 kg of the feed with 10 liters $H_2O$ and 61.8 liters of solution 17 recycled from the second stage pressure leach 18.

A second stage leach solution 17 is produced having the following composition: 45 gpl Ni, 49 gpl Cu, < 0.5 gpl $H_2SO_4$ (pH 3.2), 0.4 gpl Fe. The pH may range from about 3.0 to 4.0.

The first stage atmospheric leach slurry is maintained in the temperature range of 72° to 80° C for 6 hours while continuously flowing air into the atmospheric leaching tanks at about 2.0 SCFM. The leaching is continued to a terminal pH of about 5.4. However, the pH may range from about 5 to 6.

During the first stage atmospheric leach, a number of reactions (leaching, cementation, hydrolyzation, oxidation) take place as previously indicated in Example 1.

The nickel is partially solubilized, the amount being about 50% by weight of the total nickel in the feed, while practically all the copper from the second stage pressure leach solution 17 is cemented and hydrolyzed out, thereby providing a highly enriched nickel solution having the following composition: 78 gpl Ni, 1 gpl Co and low in impurities.

The leached residue (10.8 kg) remaining in the first stage atmospheric leach is washed with water and then reslurried in 30.0 liters of water and 33.5 liters of part of the pregnant solution from the third stage pressure leach 19 before passing to the second stage pressure leach.

The leached residue and the recycle third stage pressure leach pregnant solution have the following compositions:

Table 22

| Leach Residue (10.8 kg) | | Third Stage Leach Solution (33.5 liters) | |
|---|---|---|---|
| Ni | 25.5% | Ni | 45.1 gpl |
| Cu | 45.3% | Cu | 70.0 gpl |
| Fe | 4.2% | $H_2SO_4$ | 2.0 gpl |
| S | 20.1% | pH | 1.9 |
| Oxygen and others | 5.07 | | |

Nickel extraction obtained in the atmospheric leach is determined as follows:

| Feed Nickel 10 kg × 0.542 | = 5420 gms |
|---|---|
| Leach Residue 10.8 kg × .255 | = 2754 gms |
| Ni extractions = $\frac{5420 - 2754}{5420}$ × 100 | = 49.2% |

The second stage pressure leach in which additional nickel and some copper are leached is carried out under the following conditions using a pulp density of about 13 to 15% solids by weight:

Table 23

| Temperature | 160° C to 165° C |
|---|---|
| Oxygen Over Pressure | 3 - 3.4 atm. gage |
| Acidity, pH (Terminal) | 3.2 |
| Oxygen Supply | Sufficient to oxidize metallics into oxides and 30-40% of sulfide sulfur to sulfates, and ferrous ions to the ferric state |
| Time | 40 minutes |

The amount of recycle third stage pregnant solution 20 fed to the second stage leach is proportioned to provide a total molar ratio of free $H_2SO_4$ plus $CuSO_4$ to the nickel in the atmospheric leach residue of 0.8:1.

The leaching, cementation, oxidation and hydrolyzing reactions taking place in the second stage pressure leach are similar to those in the first stage atmospheric leach set forth in Example 1. In addition, two more reactions play a significant role in this stage. They are:

$$NiS \text{ (or CuS)} + 2 O_2 \rightarrow NiSO_4 \text{ (or CuSO}_4\text{)}$$

$$NiS + CuSO_4 \rightarrow NiSO_4 + CuS$$

Following the second stage pressure leach, the following leach solution 17 is obtained for recycle to the first stage atmospheric leach: 45 gpl Ni, 49 gpl Cu, 0.5 gpl $H_2SO_4$ (pH 3.2), 0.4 gpl Fe. The pH may range from about 3 to 4.

The second stage leach solids (8.4 kg) has the following composition:
18.7% Ni
49.6% Cu
5.4% Fe
14.2% S
12% Oxygen and impurities The nickel extraction in this stage is about 42% and the copper extraction about 14.8%.

The nickel extraction in the second stage based on the total nickel in the starting feed material is about 21%.

The second stage leach residue is prepared for the third stage pressure leach 19 by forming a pulp in 34 liters water, 42 liters of recycle spent copper-sulfuric acid solution 21 containing 47 gpl Ni, 30 gpl Cu and 67 gpl $H_2SO_4$. Also, 2.7 kg conc. $H_2SO_4$ is added to provide a total surfur to total Ni+Cu+Co molar ratio in this stage of about 1:1.

The leaching conditions are as follows:

Table 24

| Temperature | 195° C to 200° C |
|---|---|
| Oxygen | 6 to 7 atm. gage |
| Oxygen Supply | To oxidize sulfide sulfur to sulfates |
| Acidity pH (Terminal) | 2.1 |
| Time | 60 minutes |

The foregoing provides a pregnant solution 20 parts of which is recycled to the second stage pressure leach, with the remainder going to the copper winning circuit 22. The solution has the following composition: 47 gpl Ni, 70 gpl Cu, 2.8 gpl Fe.

The leach residue (1.1 kg) is discarded and has the following approximate composition: 5.0 to 6.0% Ni, 3 to 4% Cu, 38 to 40% Fe, the balance consisting of oxygen (mostly combined with iron) and impurities contained in the feed.

The total recovery using the foregoing flowsheet is very close to 99% and 98% for nickel and copper, respectively.

EXAMPLE 6

The flow sheet of FIG. 2 is employed for leaching the following nickel-copper matte in which the weight ratio of nickel to copper is about 1.41:1: Ni - 44.5%, Cu - 31.5%, Co - 0.6%, Fe - 2.8%, S - 19.2% and 1 - 1.5% impurities.

The feed matte is provided in the size range set forth in Example 1. A first stage atmospheric leach slurry 16 is provided by mixing 10 kg of feed matte with 10 liters of water and 46.7 liters of solution recycled from second stage leach 18; the second stage leach solution having the following composition: 66 gpl Ni, 34 gpl Cu, 0.2 gpl Fe, 0.5 gpl H₂SO₄ (pH 3.8). The pH may range from about 3.0 to 4.0.

The first stage atmospheric leach slurry 16 is maintained in the temperature range of 75° to 80° C for 3.5 hours, while continuously flowing air into the atmospheric leach tank at about 2.5 SCFM. The leaching is carried out to a terminal pH of 5 to 6, e.g., pH 5.5.

The nickel is partially solubilized until about 30% of the total nickel feed in the matte is dissolved and substantially all of the copper in the second stage pressure leach recycle solution 17 is cemented and hydrolyzed out to provide a highly enriched nickel leach solution having the following composition: Ni - 82 gpl, Si less than 0.03 gpl and Fe, Al, Cu, Sb, As, Sn and Se each less than 0.01 gpl.

The leached residue remaining in the first stage atmospheric leach (10.4 kg) is passed to the second stage pressure leach 18 after being reslurried in 12.9 liters of water and 35.8 liters of the third stage pregnant solution 20, part of which is recycled to the second stage. The leach residue and recycle third stage pregnant solution have the following composition:

Table 25

| Leach Solids (10.4 kg) | | Third Stage Leach Solution (35.8 liters) |
|---|---|---|
| Ni | 29.9% | 38 gpl Ni |
| Cu | 45.9% | 75 gpl Cu |
| S | 18.9% | 2 gpl H₂SO₄ |
| Fe | 2.8% | pH 2.1 |
| Oxygen and impurities | 2 - 3% | |

The actual nickel extraction in the first stage atmospheric leach is about 30.1%.

The second stage pressure leach is carried out under the following conditions:

Table 26

| Temperature | 170° C to 180° C |
|---|---|
| Oxygen Pressure | 4 atm. gage |
| Acidity pH (Terminal) | 3.8 |
| Oxygen Supply | Sufficient to oxidize metallics to oxides and about 20% of the sulfide sulfur to sulfates and ferrous ions to the ferric state |
| Time | 25 minutes |

The amount of the third stage pressure leach recycle 20 is proportioned to give a total molar ratio of free H₂SO₄ plus CuSO₄ to the nickel in the atmospheric leach residue of about 0.8:1.

Following the second stage pressure leach 18, the following leach solution is obtained for recycle to atmospheric leach: 66 gpl Ni, 34 gpl Cu, 0.2 gpl Fe, 0.5 gpl H₂SO₄ with the pH about 3.8 (the pH may range from about 3.0 to 4.0).

The second stage pressure leach residue (9.5 kg) has the following composition: Ni - 14.7%, Cu - 61.3%, Fe - 3.0%, balance being oxygen and impurities 4 - 5%.

The nickel extraction in the second stage pressure leach is about 55.1% based on the nickel in the atmospheric leach residue.

The nickel extraction in the second stage based on the total nickel in the starting feed matte is about 38.5%.

The second stage leach residue is passed to the third stage pressure leach 19 after being reslurried with 35 liters of H₂O, 65 liters of the spent copper-sulfuric acid solution 21 (38 gpl Ni, 28 gpl Cu and 72 gpl H₂SO₄) recycled from copper winning circuit 22 and with 1.8 kg conc. H₂SO₄. H₂SO₄ is added to provide a total sulfur/total Ni+Cu molar ratio in an amount of about 1:1.

The third stage pressure leach 19 is conducted under the following conditions:

Table 27

| Temperature | 180° C to 190° C |
|---|---|
| Oxygen | 6 atm. gage |
| Oxygen Supply | To oxidize metallics to oxides, sulfide sulfur to sulfates and ferrous ions to the ferric state |
| Acidity, pH (Terminal) | 2.1 |
| Time | 90 minutes |

The foregoing provides a pregnant solution 20, part going to the copper winning circuit 22 and part to the second stage leach, the solution having the following composition: Ni - 38 gpl, Cu - 75 gpl, Fe - 2.7 gpl.

The leach residue (0.8 kg) assays as follows: Ni - 5.1%, Cu - 8.3%, Fe - 35.6%, S - 9.2% and balance oxygen and other impurities contained in the feed matte.

The recovery of metal values is about 99 and 98% of nickel and copper, respectively.

EXAMPLE 7

This example which also relates to the flow sheet of FIG. 2 employs the same matte as in Example 5 except that acid is added to the third stage recycle solution for recycling to the second stage pressure leach. The matte composition is set forth below:

Ni - 44.5%, Cu - 31.5%, Co - 0.6%, Fe - 2.8%, S - 19.2%, 1 - 1.5% other trace elements (impurities).

The feed matte is comminuted in the size range indicated for Example 1. A first stage atmospheric leach slurry 16 is produced by mixing 10 kg of feed matte with 10 liters of water and 44 liters of solution recycled from the second stage leach 18, the second stage leach solution having the following composition: 74 gpl Ni, 32 gpl Cu, 0.5 - 1 gpl H₂SO₄ (pH 2.9), 0.6 gpl Fe. The pH may range from about 2.7 to 4.0.

The first stage atmospheric leach slurry is maintained in the temperature range of 68° to 74° C for 2.5 hours while continuously flowing air into the atmospheric leach tank at about 3.0 SCFM. The leaching is carried out to a terminal pH of 5.7.

The nickel is partially solubilized until about 25% of total nickel in the matte is dissolved and substantially all of copper, iron and other impurities in the recycle solution are cemented and hydrolyzed out to provide a highly enriched nickel solution having the following composition: 86 gpl Ni, 1.1 gpl Co and other impurities as indicated in Example 6.

The leached residue (10.3 kg) is washed, then reslurried with 5.3 liters of H₂O and 40.1 liters of pregnant leach solution from the third stage pressure leach 19 which is acidified by the addition of 1.1 kg of concentrated H₂SO₄.

The leached residue and the acidified third stage recycle pregnant solution will have the following composition:

Table 28

| Leach Residue (10.3 kg) | | Acidified Third Stage Leach Solution (40.7 liters) | |
|---|---|---|---|
| Ni | 32.4% | Ni | 29 gpl |
| Cu | 44.1% | Cu | 72 gpl |
| S | 19.6% | H₂SO₄ | 28 gpl |

Table 28-continued

| Leach Residue (10.3 kg) | | Acidified Third Stage Leach Solution (40.7 liters) | |
|---|---|---|---|
| Fe | 2.7% | pH | 1.0 |
| Balance trace elements and oxygen | | | |

The nickel extracted in the first stage atmospheric leach is about 25%.

The second stage pressure leach 18 is carried out under the following conditions:

Table 29

| Temperature | 143° C to 155° C |
|---|---|
| Oxygen Pressure | 2 to 2.7 atm. gage |
| Acidity, pH (Terminal) | 2.9 |
| Oxygen Supply | To oxidize metallics to oxides and ferrous ions to the ferric state |
| Time | 45 minutes |

The amount of recycle third stage pregnant solution 20 is proportioned to provide a total molar ratio of free $H_2SO_4$ plus $CuSO_4$ to the nickel in the atmospheric leach residue of about 1:1.

Following the second stage pressure leach, the following leach solution is obtained for recycle to the first stage atmospheric leach 16: 74 gpl Ni, 32 gpl Cu, 0.5 - 1 gpl $H_2SO_4$ (pH 2.9), 0.6 gpl Fe. The pH may range from about 2.7 to 4.0.

The second stage leach residue (9.7 kg) following leaching will have the following composition: Ni - 12.8%, Cu - 62.2%, S - 20.6%, Fe - 2.7%, balance trace elements.

The second stage nickel extraction based on the total nickel in the feed matte is about 47.1%.

The second stage leached residue is reslurried in 40 liters $H_2O$, 0.7 kg conc. $H_2SO_4$ and 69.7 liters of the recycle copper winning solution (Ni - 29 gpl, Cu - 28 gpl, $H_2SO_4$ - 68 gpl) before it is subjected to the third stage total leach under the following conditions:

Table 30

| Temperature | 200° C to 205° C |
|---|---|
| Oxygen Pressure | 5.75 atm gage |
| Oxygen Supply | To oxidize metallics and convert sulfide sulfur to sulfates and to oxide ferrous ions to the ferric state |
| Acidity, pH (Terminal) | 2.2 |
| Time | 70 minutes |

The foregoing provides a pregnant solution 20 going to the copper winning circuit 22 and to the second stage leaching, the solution having the following composition: 29 gpl Ni, 72 gpl Cu, 1.8 gpl Fe.

The third stage leached residue (0.9 kg) contains by weight 7.5% Ni and 8.5% Cu and impurities, the total nickel and copper recovery ranging from about 98% to 99%.

EXAMPLE 8

The process of this example is conducted in accordance with the flow sheet of FIG. 2 in which relatively high nickel (about 48% by weight) is leached from the following nickel-copper sulfide composition in the first stage atmospheric leach and about 10% by weight of copper in the second stage: Ni - 57.4%, Cu - 13.9%, Fe - 3.6%, S - 22.3% and < 1% various impurities (Ni/Cu weight ratio 4.13).

The feed is processed in the size range set forth in Example 1. A first stage atmospheric leach slurry 16 is produced by mixing 10 kg of the feed with 10 liters $H_2O$ and 64 liters of solution recycled from the second stage pressure leach 18 having the following composition: 50 gpl Ni, 48 gpl Cu, < 0.5 gpl $H_2SO_4$ (pH 3.4), 0.2 gpl Fe. The pH may range from about 3.0 to 4.0.

The first stage atmospheric leach slurry is maintained in the temperature range of 74° to 80° C for 6 hours while continuously flowing air into the atmospheric leaching tanks at about 3.0 SCFM. The leaching is carried out to a terminal pH of 5.6. The pH may range, however, from 5 to 6.

During the first stage atmospheric leach, a number of reactions (leaching, cementation, hydrolyzation and oxidation) takes place as pointed out in Example 1.

The nickel is partially solubilized and about 48% extracted from the feed, while practically all the copper from the second pressure stage leach solution 18 is cemented and hydrolyzed out to provide a highly enriched nickel solution having the following composition: 80 gpl Ni, 2 gpl Co, and impurities as set forth in Example 3.

The leached residue (10.9 kg) remaining in the first stage atmospheric leach is washed with water and then slurried in 27.3 liters of water and 38.2 liters of the recycle pregnant solution from the third stage pressure leach before passing to the second stage pressure leach.

The leached residue and the recycle third stage pregnant solution will have the following compositions:

Table 31

| Leach Residue (10.9 kg) | | Third Stage Leach Solution (38.2 liters) | |
|---|---|---|---|
| Ni | 27.3% | Ni | 48 gpl |
| Cu | 40.8% | Cu | 68.0 gpl |
| Fe | 3.9% | $H_2SO_4$ | 2.0 gpl |
| S | 20.8% | pH | 1.9 |
| Oxygen and others | about 7.0% | | |

The nickel extraction in the first stage atmospheric leach based on the total nickel in the feed is about 48.1%.

The second stage pressure leach 18 whch provides additional nickel and partial copper solubilization (copper is being solubilized to supply needed curpric ions for the atmospheric leach) is carried out under the following conditions:

Table 32

| Temperature | 172° C to 177° C |
|---|---|
| Oxygen Pressure | 2.7 to 3.4 atm. gage |
| Acidity, pH (Terminal) | 3.3 |
| Oxygen Supply | Sufficient oxygen to oxidize metallics to oxides, about 30% of sulfide sulfur to sulfates and ferrous ions to the ferric state |
| Time | 40 minutes |

The amount of recycle third stage pregnant solution is proportioned to provide a total molar ratio of free $H_2SO_4$ plus $CuSO_4$ to the nickel in the atmospheric residue of about 0.8:1.

Following the second stage pressure leach, the following leach solution is obtained for recycle to the atmospheric leach: Ni - 50 gpl, Cu - 48 gpl, Fe - 0.2 gpl, $H_2SO_4$ - < 0.5 gpl (pH 3.4) and trace elements.

The pH may range from about 3 to 4. The second stage leach solids following leaching will have the following composition by weight:

| | |
|---|---|
| Weight | 7.9 kg |
| Ni | 23.7% |
| Cu | 50.5% |
| Fe | 4.8% |
| S | 18.2% |
| Impurities | 3 – 4% |

Thus, on the basis of the intial and final weights and analyses of the residues, the following extractions are obtained.

The nickel and copper extractions in the second stage pressure leach calculate to 37.1% and 10.3%, respectively.

The nickel extraction in the second stage based on the total nickel in the starting feed is about 19.7% by weight.

The second stage residue is passed to the third stage pressure leach 19 and subjected to total leaching as follows:

Table 33

| | |
|---|---|
| Temperature | 193° C to 200° C |
| Oxygen Pressure | 7 atm. gage |
| Oxygen Supply | To oxidize sulfide sulfur to sulfates and effect dissolution thereof |
| Acidity, pH (Terminal) | 1.8 |
| Time | 75 minutes |

The second stage residue is prepared for third stage leaching by forming a slurry with about 39 liters $H_2O$ and 41.6 liters of the spent copper winning solution (48 gpl Ni, 34 gpl Cu, 50 gpl $H_2SO_4$, 3 – 4 gpl Fe). Also, 2.8 kg $H_2SO_4$ are added to make up the total sulfur to total Ni+Cu+Co molar ratio in the stage of about 1:1.

The third stage leach provides a pregnant solution part of which is recycled to the second stage leach and the remainder passed to the copper winning circuit, the composition being as follows: Ni - 48 gpl, Cu - 68 gpl, Fe - 3 to 4 gpl.

The leached residue after washing (1.1 kg) contains 1 and 3% of nickel and copper, respectively, of the total contained in the feed.

The pregnant solution of the third stage pressure leach is passed to the copper winning circuit to recover copper contained in the feed and to produce the recycle spent copper-sulfuric acid solution for recycle to the first stage atmospheric leach.

The term "copper-sulfuric acid solution" as employed in this specification is understood to include copper solutions, with and without nickel, which may or may not contain free sulfuric acid. Thus, a solution containing little or no free acid would be one in which the acid is combined as non-ferrous metal sulfates.

The process of the invention provides nickel and copper products of high purity, e.g. 99.9% and higher. For example, with respect to the nickel product, the main impurities, after removing cobalt by known methods, are copper and iron which are maintained at levels less than 15 ppm Cu and less than 40 ppm Fe. Similarly, in the case of copper, nickel is maintained to below 15 ppm and iron to below 10 ppm.

In summary, the invention provides a unique multistage process having the following novel features:

(1) Flexibility to accept a wide variety of sulfur-containing nickel and copper-bearing materials;

(2) Provision of a first stage atmospheric leach which has the following advantages:

(a) enables significant nickel extraction with a high purification capability;

(b) enables separation of nickel from copper;

(c) enables the purification of substantially all plant recycle streams containing retained non-ferrous metal values and impurities which normally would pose environmental pollution problems;

(d) provides in combination with the second and third leach on easy overall control of a unit process regardless of variation in process conditions or variation in plant process streams; and (e) eliminates dependence on the use of foreign neutralizing or scavenging reagents which normally add to the cost of leaching processes.

(3) Provision of a second stage pressure leach that can tolerate the production of a nickel leach solution having a relatively high amount of copper which can be purified in the first stage atmospheric leach step;

(4) Toleration of strong oxidizing conditions in the second stage leach step, thus allowing for the dissolution of nickel and also of copper, particularly cement copper and hydrolyzed copper in the atmospheric leach residue to provide cupric ions from recycle to the first stage atmospheric leach step to effect dissolution of metallic nickel in the feed;

(5) Provides for the use of an alternate recycle of part of the third stage pregnant solution to the second stage pressure leach;

(6) Control of the total molar ratio of free $H_2SO_4$ plus $CuSO_4$ in the recycle copper-sulfuric acid solution to the nickel of the atmospheric leach residue over the range of about 0.7:1 to 1.3:1 which provides for operational flexibility of the process; and (7) Provides for retaining substantially all of the impurities in the residues which are easily filterable.

An advantage of item (7) above is that the iron is easily rejected from solution without using precipitants, such as ammonia or alkali metal hydroxides, which form iron hydroxides which are very difficult to filter. The iron precipitates formed under elevated pressure and temperature in accordance with the process of the invention tend to have a crystalline characteristic and are therefore easy to filter.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for the hydrometallurgical refining of a sulfur-containing nickel-copper concentrate in which at least about 20% by weight of the total nickel present is in an acid-soluble metallic form which comprises:

providing a slurry of said concentrate in particulate form in a copper-containing sulfuric acid leaching solution having a pH ranging up to about 3.5, subjecting said slurry to a first stage leaching and refining step at atmospheric pressure and a temperature ranging from about 40° to 95° C while simultaneously aerating said slurry to effect the simultaneous dissolution of nickel and cementation of substantial amounts of copper from said solution, continuing said leaching to a terminal pH of over about 5 to refine said solution by further rejecting copper and impurities therefrom by hydrolysis and provide a purified nickel sulfate solution and a first stage atmospheric leach residue containing undissolved nickel, copper and impurities, separating said purified solution from said first stage atmospheric leach residue for nickel recovery, subjecting said first stage atmospheric leach residue as a slurry to a second stage oxidation leaching step at elevated temperature and pressure in a copper-containing sulfuric acid solution for a time sufficient to reach a terminal pH ranging from about 2.5 to 4 and to effect dissolution of substantial amounts of nickel and some copper and provide a second stage pregnant solution thereof and a second stage residue impoverished in said nickel, the copper-containing sulfuric acid solution employed in said second stage leaching step having a composition such that the total molar ratio of free $H_2SO_4$ plus $CuSO_4$ to the nickel in said atmospheric leach residue ranges from about 0.7:1 to 1.3:1, separating the second stage pregnant solution containing nickel and copper from said second stage leach residue, recycling said second stage pregnant solution to said first stage atmospheric leach for separating the nickel from dissolved copper and impurities in said solution, subjecting said second stage leach residue to a third stage oxidation leaching step at elevated temperature and pressure in a sulfuric acid-containing solution with the total sulfur to the total nickel + copper ratio on the molar basis ranging from about 0.9:1 to 1.3:1 to effect dissolution of substantially all of the nickel and copper in said residue, thereby forming a third stage leach residue and a third stage pregnant nickel-copper sulfate solution containing a major amount of copper, and having a terminal pH ranging up to about 3, subjecting said third stage pregnant solution to a copper winning step for the selective removal of copper while regenerating acid therein and thereby provide a spent copper-sulfuric acid solution, and recycling said spent acid solution back into the process to recover the remaining non-ferrous metal values therefrom.

2. The process of claim 1, wherein the copper in the third stage pregnant solution is removed by electrowinning while simultaneously regenerating sulfuric acid and thereby provide a recyclable spent copper-sulfuric acid solution.

3. The process of claim 2, wherein the spent copper-sulfuric acid solution is recycled to the third stage leach, and wherein part of the third stage pregnant solution is recycled to the second stage leach.

4. The process of claim 3, wherein additional make-up sulfuric acid is added to the third stage leach to control the pH therein.

5. The process of claim 4, wherein additional make-up sulfuric acid is also added to one or more of the first stage leach, the second stage leach and the copper winning step to control the pH therein.

6. The process of claim 2, wherein said spent copper-sulfuric acid solution is recycled to at least the third stage leach.

7. The process of claim 2, wherein the spent copper-sulfuric acid electrolyte is recycled partly to the third stage leach and partly to the second stage leach.

8. The process of claim 1, wherein the second stage leach is carried out at an elevated temperature range of about 95° to 205° C at a total pressure of about 0.3 to 50 atmospheres gage and an oxygen partial pressure of at least about 0.3 atmosphere gage, and wherein the third stage leach is carried out at an elevated temperature range of about 150° to 240° C at a total pressure of about 7 to 50 atmospheres gage and an oxygen partial pressure of at least about 0.7 atmosphere gage.

9. The process of claim 1, wherein the first stage atmospheric leach is carried out at a temperature ranging from about 60° to 85° C.

10. The process of claim 1, wherein the terminal pH of the second stage leach ranges from about 2.8 to 3.3, and wherein the total sulfur to nickel plus copper molar ratio in the third stage leach ranges from about 1:1 to 1.1:1.

11. The process of claim 1, wherein the sulfur-containing nickel-copper concentrate has the following composition by weight:
Ni: about 30% to 70%
Cu: about 5% to 40%
S: about 5% to 25%
Fe: up to about 15%
As: up to about 5%
and other impurities ranging up to a total of about 5%.

12. The process of claim 1, wherein the molar ratio of the total moles of free $H_2SO_4$ plus $CuSO_4$ in the copper-containing sulfuric acid to the nickel in the atmospheric leach residue ranges from about 0.7:1 to 0.95:1.

13. A process for the hydrometallurgical refining of comminuted nickel-copper matte in which at least about 20% by weight of the total nickel present is in an acid-soluble metallic form which comprises:

providing a slurry of said comminuted matte in a copper-containing sulfuric acid leaching solution having a pH ranging up to about 3.5, subjecting said matte slurry to a first stage leaching and refining step at atmospheric pressure and a temperature ranging from about 40° to 95° C while simultaneously aerating said slurry to effect the simultaneous dissolution of nickel and cementation of substantial amounts of copper from said solution, continuing said leaching to a terminal pH of over about 5 to refine said solution by further rejecting copper and impurities therefrom by hydrolysis and provide a purified nickel sulfate solution and a first stage atmospheric leach residue containing undissolved nickel, copper and impurities, separating said purified solution from said first stage atmospheric leach residue for nickel recovery, subjecting said first stage atmospheric leach residue as a slurry to a second stage oxidation leaching step at elevated temperature and pressure in a copper-containing sulfuric acid solution for a time sufficient to reach a terminal pH ranging from about 2.5 to 4 and to effect dissolution of substantial amounts of nickel and some copper and provided a second stage pregnant solution thereof and a second stage residue impoverished in said nickel, the copper-containing sulfuric acid solution employed in said second stage leaching step having a composition such that the total molar ratio of free $H_2SO_4$ plus $CuSO_4$ to the nickel in said atmospheric leach residue ranges from about 0.7:1 to 1.3:1, separating the second stage pregnant solution containing nickel and copper from said second stage leach residue, recycling said second stage pregnant solution to said first stage atmospheric leach for separating the nickel from dissolved copper and impurities in said solution, subjecting said second stage leach residue to a third stage oxidation leaching step at elevated temperature and pressure in a sulfuric acid-containing solution with the total sulfur to the total nickel plus copper ratio on the molar basis ranging from about 0.9:1 to 1.3:1 to effect dissolution of substantially all of the nickel and copper in said residue, thereby forming a third stage leach residue and a third stage pregnant nickel-copper sulfate solution containing a major amount of copper, and having a terminal pH ranging up to about 3, subjecting said third stage pregnant solution to a copper winning step for the selective removal of copper while regenerating acid therein and thereby provide a spent copper-sulfuric acid solution, and recycling said spent acid solution back into the process to recover the remaining non-ferrous metal values therefrom.

14. The process of claim 13, wherein the copper in the third stage pregnant solution is removed by electrowinning while simultaneously regenerating sulfuric acid and thereby provide a recyclable spent copper-sulfuric acid solution.

15. The process of claim 14, wherein part of the third stage pregnant solution is recycled to the second stage leach.

16. The process of claim 15, wherein additional makeup sulfuric acid is added to the third stage leach to control the pH therein.

17. The process of claim 16, wherein additional makeup sulfuric acid is also added to one or more of the first stage leach, the second stage leach and the copper winning step to control the pH therein.

18. The process of claim 14, wherein the spent copper-sulfuric acid electrolyte is recycled partly to the third stage leach and partly to the second stage leach.

19. The process of claim 13, wherein the second stage leach is carried out at an elevated temperature range of about 95° to 205° C at a total pressure of about 0.3 to 50 atmospheres gage and an oxygen partial pressure of at least about 0.3 atmosphere gage, and wherein the third stage leach is carried out at an elevated temperature range of about 150° to 240° C at a total pressure of about 7 to 50 atmospheres gage and an oxygen partial pressure of at least about 0.7 atmosphere gage.

20. The process of claim 13, wherein the first stage atmospheric leach is carried out at a temperature ranging from about 60° to 85° C.

21. The process of claim 13, wherein the terminal pH of the second stage leach ranges from about 2.8 to 3.3, and wherein the total sulfur to nickel plus copper ratio in the third stage leach ranges from about 1:1 to 1.1:1.

22. The process of claim 13, wherein the nickel-copper matte has the following composition by weight:
Ni: about 30% to 70%
Cu: about 5% to 40%
S: about 5% to 25%
Fe: up to about 15%
As: up to about 5%
and other impurities ranging up to a total of about 5%.

23. The process of claim 13, wherein the molar ratio of the total moles of free $H_2SO_4$ plus $CuSO_4$ in the copper-containing sulfuric acid to the nickel in the atmospheric leach residue ranges from about 0.7:1 to 0.95:1.

24. A process for the hydrometallurgical refining of comminuted nickel-copper matte in which at least about 20% by weight of the total nickel present is in an acid-soluble metallic form which comprises:

providing a slurry of said concentrate in particulate form in a copper-containing sulfuric acid leaching solution having a pH ranging up to about 3.5, subjecting said slurry to a first stage leaching and refining step at atmospheric pressure and a temperature ranging from about 40° to 95° C while simultaneously aerating said slurry to effect the simultaneous dissolution of nickel and cementation of substantial amounts of copper from said solution, containing said leaching to a terminal pH of over about 5 to refine said solution by further rejecting copper and impurities therefrom by hydrolysis and provide a purified nickel sulfate solution and a first stage atmospheric leach residue containing undissolved nickel, copper and impurities, separating said purified solution from said first stage atmospheric leach residue for nickel recovery, subjecting said first stage atmospheric leach residue as a slurry to a second stage oxidation leaching step at elevated temperature and pressure in a copper-containing sulfuric acid solution for a time sufficient to reach a terminal pH ranging from about 2.5 to 4 and to effect dissolution of substantial amounts of nickel and some copper and provide a second stage pregnant solution thereof and a second stage residue impoverished in said nickel, the copper-containing sulfuric acid solution employed in said second stage leaching step being controlled in composition such that the total molar ratio of free $H_2SO_4$ plus $CuSO_4$ to the nickel in said atmospheric leach residue ranges from about 0.7:1 to 1.3:1, separating the second stage pregnant solution containing nickel and copper from said second stage leach residue, recycling said second stage pregnant solution to said first stage atmospheric leach for separating the nickel from dissolved copper and impurities in said solution, subjecting said second stage leach residue to a third stage oxidation leaching step at elevated temperature and pressure in a sulfuric acid-containing solution with the total sulfur to the total nickel plus copper ratio on the molar basis ranging from about 0.9:1 to 1.3:1 to effect dissolution of substantially all of the nickel and copper in said residue, thereby forming a third stage leach residue and a third stage pregnant nickel-copper sulfate solution containing a major amount of copper, and having a terminal pH ranging up to about 3, recycling a portion of said third stage pregnant solution to said second stage leach, subjecting the remainder of said third stage pregnant solution to a copper winning step for the selective removal of copper while regenerating acid therein and thereby provide a spent copper-sulfuric acid solution, and recycling said spent acid solution back to said third stage leach, whereby a continuous counterflow system is provided, wherein leached residue flows from atmospheric leach through the second stage leach to the third stage leach, wherein the spent copper-sulfuric acid solution is recycled to the third stage leach, wherein a portion of the third stage pregnant solution is recycled to the second stage leach and substantially all of the second stage pregnant solution is recycled to said atmospheric leach from which a substantially pure nickel sulfate solution is produced.

25. The process of claim 24, wherein the copper in the third stage pregnant solution is removed by electrowinning while simultaneously regenerating sulfuric acid and thereby provide a recyclable spent copper-sulfuric acid solution.

26. The process of claim 25, wherein additional makeup sulfuric acid is added to the third stage leaching step to control the pH therein.

27. The process of claim 26, wherein additional makeup sulfuric acid is also added to one or more of the first stage leach, the second stage leach and the copper winning step to control the pH therein.

28. The process of claim 24, wherein the second stage leach is carried out at an elevated temperature range of about 95° to 205° C at a total pressure of about 0.3 to 50 atmospheres gage and an oxygen partial pressure of at least about 0.3 atmosphere gage and wherein the third stage leach is carried out at an elevated temperature range of about 150° to 240° C at a total pressure of about 7 to 50 atmospheres gage and an oxygen partial pressure of at least about 0.7 atmosphere gage.

29. The process of claim 24, wherein the first stage atmospheric leach is carried out at a temperature ranging from about 60° to 85° C.

30. The process of claim 24, wherein the terminal pH of the second stage leach ranges from about 2.8 to 3.3 and wherein the total sulfur to nickel plus copper ratio in the third stage leach ranges from about 1:1 to 1.1:1.

31. The process of claim 24, wherein the nickel-copper matte has the following composition by weight:
Ni: about 30% to 70%
Cu: about 5% to 40%
S: about 5% to 25%
Fe: up to about 15%
As: up to about 5%
and other impurities ranging up to a total of about 5%.

32. The process of claim 24, wherein the molar ratio of the total moles of free $H_2SO_4$ plus $CuSO_4$ in the copper-containing sulfuric acid to the nickel in the atmospheric leach residue ranges from about 0.7:1 to 0.95:1.

* * * * *